March 9, 1948.  E. B. MERIPOL  2,437,546
SUPERCHARGED ENGINE CONTROL
Filed March 18, 1943  2 Sheets-Sheet 1
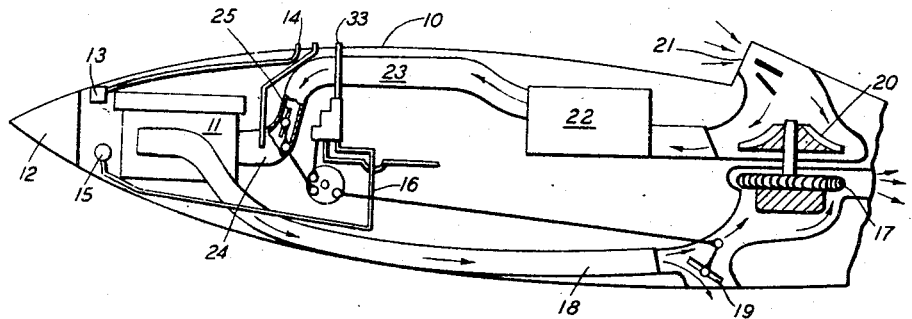
Fig. I
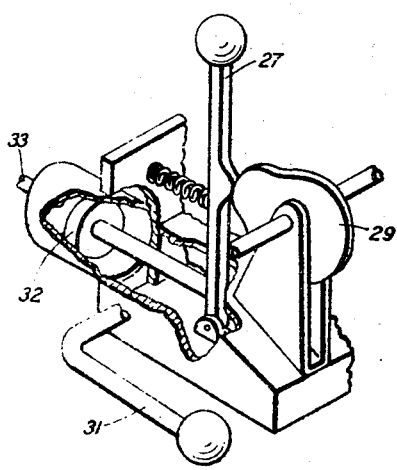
Fig. III
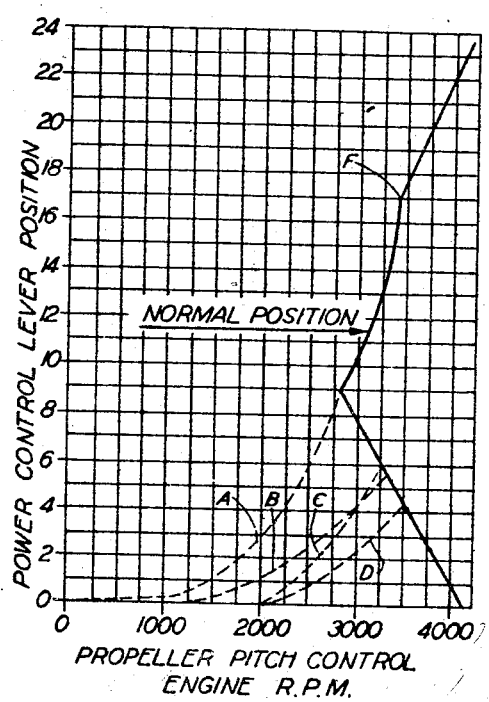
Fig. IV
INVENTOR
EDWARD B. MERIPOL
BY George C. Sullivan

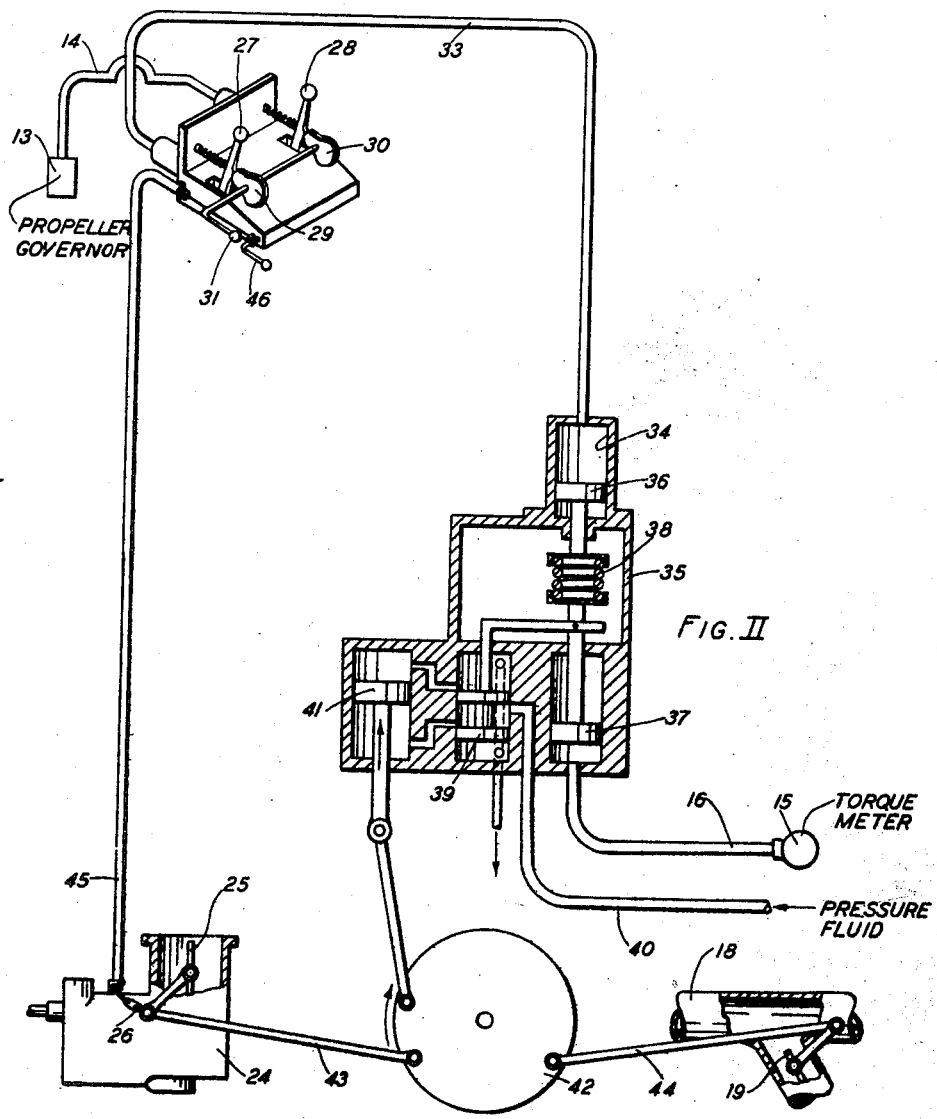

Patented Mar. 9, 1948

2,437,546

UNITED STATES PATENT OFFICE 2,437,546

SUPERCHARGED ENGINE CONTROL

Edward B. Meripol, Los Angeles, Calif., assignor to Lockheed Aircraft Corporation, Burbank, Calif.

Application March 18, 1943, Serial No. 479,669

2 Claims. (Cl. 170—135.6)

This invention relates to an automatic control of the variables encountered in the operation of high powered aircraft engines, the manual operation and correlation of which imposes an excessive burden on a pilot who must also devote his attention to flight control, and the operation of armament in the case of military airplanes.

A normal manual control of an aircraft engine embodies several variables, including the revolutions at which the adjustable propeller governor is set, the engine throttle, the supercharger, and the mixture control. The mixture control can be more or less automatic, but is required to give a rich mixture for idling, a lean mixture for cruising, a richer mixture for best power, and an over-rich mixture for "fuel cooling" at the maximum take-off power rating. A conventional operating technique is to control the engine speed by adjustment of the propeller governor and to control the intake manifold pressure by a combination of throttle and supercharger controls. If the supercharger is of the exhaust turbine driven type its operation is controlled by a waste gate which diverts the exhaust gases from the turbine. In such an arrangement the engine or carbureter throttle should be nearly full open before the supercharger is brought into play; although somewhat overlapped in order to bring the supercharger up to speed, to prevent a "flat spot" or faltering as the cockpit throttle control is moved past the full carbureter throttle opening into the region of turbosupercharged performance.

The use of torque meters is becoming increasingly common as preferable to the use of manifold pressure for determining engine performance. This is because the engine torque and speed together form a direct measure of the horsepower developed, so that with the usual propeller governor set at a given speed the torque reading is directly proportional to the horsepower developed. I, therefore, link the usual "throttle" or engine control lever operated by the pilot to a governor mechanism responsive to the engine torque, which governor mechanism in turn operates the carbureter throttle and turbosupercharger waste gate controls by the difference between the desired torque as set by the pilot's control, and the actual torque developed by the engine. It is accordingly an object of this invention to provide a suitable mechanism responsive to the difference between the actual and desired torque, together with suitable linkages therefrom to operate the carbureter throttle and turbowaste gate.

It is a further object of this invention to provide an improved and simplified engine operating control wherein the carbureter and turbosupercharger controls are operated directly by the difference between the desired torque setting and the actual torque developed. In effect this produces an adjustable engine governor operating to control the torque developed, the governor setting being made by the pilot.

It is also an object of this invention to provide a control system of the type described wherein the control acts to fully open the carbureter throttle before the turbosupercharger comes into effect; and when decreasing engine output to shut off the turbosupercharger before starting to close the throttle, thus avoiding operation of the supercharger when the throttle is partially closed. In this connection, it is desirable to warm up and bring the turbo up to approximately its operating speed during the final stages of the opening movement carbureter throttle in order to avoid a flat spot in the operating range of the engine as would occur if the increased manifold pressure contributed by the turbosupercharger were not available immediately upon demand.

Other and further important objects of this invention will be apparent from the disclosure in the specification and the accompanying drawings.

This invention in its preferred form is illustrated in the drawings and hereinafter more fully described.

In the drawings—

Figure I is a schematic layout of an engine and turbosupercharger layout embodying one form of the controls of this invention.

Figure II is a diagrammatic layout of the control system of Figure I.

Figure III is a perspective view of a master control lever, in section for clearness.

Figure IV is a performance chart illustrative of the action of the control of this invention.

As illustrated in the drawings—

A fuselage or nacelle 10 encloses an engine 11, a nose spinner 12 carrying a conventional adjustable pitch propeller mechanism (not shown). Such propeller mechanisms have a pilot's control shown as a governor 13 and a connector 14 leading to a lever on the pilot's control column. The engine is shown as equipped with a torque meter 15 with a hydraulic line 16 leading to a control mechanism to be described later. Such torque meters are conventionally connected to a pressure gage on the pilot's instrument panel, and serve to advise the pilot of the engine output either as a substitute or as a check on the conventional manifold pressure gage. The latter formed the usual method of checking engine performance prior to the advent of torque meters, which meters are now being built into the reduction gearing of modern engines.

An exhaust driven turbo supercharger is indicated at 17 and receives exhaust gases through an exhaust pipe 18 which is provided with a waste gate 19, the opening of which puts the turbo out of action. A centrifugal blower 20 driven by the turbo receives rammed air through a scoop 21 and delivers the compressed air through an intercooler 22 and pipe 23 to a carbureter 24 on the engine, the carbureter having a conventional throttle valve 25.

The arrangement so far described is a conventional manually controlled one such as has heretofore been used on turbosupercharger installations. The carbureter may have an automatic mixture control, or a manual one, the latter one being shown at 26 in Figure II; and the pilot would be required to adjust separate throttle, mixture control, and propeller pitch control levers for each engine. Since modern high duty engines require a rich idling mixture, a lean cruising mixture, a rich power mixture and an overrich "fuel cooling" mixture for limited duration take-off ratings, the problem of adjusting and correlating all these controls, especially on a multi-engine ship, is rather involved.

An example of a control mechanism embodying the features of this invention is diagrammatically shown in Figure II wherein a pair of levers 27 and 28 at the pilot's control station may be spring urged against cams 29 and 30 operated by a common lever 31, the adjustment of which gives the engine range between idling and full power. With this arrangement the pilot can override the predetermined settings for the levers 27 and 28, but normally these levers will be coordinated by their respective cams. The lever 27 roughly corresponds to a conventional throttle lever, and will be so referred to hereinafter for convenience, as it serves to operate or control the governor mechanism integrating the carbureter throttle and turbo supercharger controls with the hydraulic pressure produced by the torque meter 15. The lever 28 is connected by the hydraulic control line 14 to the propeller governor.

While the interconnections of the levers 27 and 28 with the mechanisms controlled thereby may be mechanical, electrical, or hydraulic, I have chosen to illustrate such interconnections as hydraulic, as the particular linkage forms no part of my present invention.

As shown, the throttle lever 27 operates a hydraulic piston 32 to displace fluid in a pipe 33 leading to a piston chamber 34 in a regulator body 35, a piston 36 therein responding in step with the movements of the lever piston 32. The piston 36 is balanced against an aligned piston 37 subjected to pressure variations from the torque meter 15 through the pipe 16, and a spring 38, interposed between the pistons 36 and 37, permits relative axial motion thereof. Thus if the throttle lever is moved counter-clockwise it imposes increased pressure above the spring 38, which if not balanced by increased torque meter pressure will move the piston 36 downwardly to energize a control increasing the carbureter throttle opening and/or the closing of the turbo waste gate until the resulting torque meter pressure change restores the piston 37 into balancing relationship.

Associated with the piston 37 and movable in step therewith is an inside admission piston valve 39 which distributes pressure fluid from a pipe 40 connected to the airplane's hydraulic pressure source through suitable ports to either end of an operating piston 41. This piston is connected to an oscillatable integrator or wrist plate 42, a link 43 from the wrist plate in turn operates the carbureter throttle 25 from the wrist plate; while a second link 44 also operates the waste gate 19 therefrom. The connections between the links 43 and 44 and the integrator or wrist plate 42 are so arranged that when the piston 41 moves upwardly from its mid-position to move the wrist plate clockwise, the waste gate link is given its maximum movement in a direction to close the gate, while the carbureter throttle remains substantially open. Contrawise, when the piston 41 moves downwardly the carbureter link 43 moves to close the throttle while the waste gate remains open. In the position shown on the drawing the carbureter throttle has reached substantially full opening, while the waste gate is just beginning to be closed by a clockwise rotation of the integrator or wrist plate due to upward movement of the piston 41; the piston valve 39 having been displaced downwardly from its mid-position, to admit fluid pressure below the piston 41.

The throttle lever 27 can be manually adjusted to increase or decrease the torque meter reading, and the resulting pressure imposed below the piston 37, in opposition to the pressure imposed above the piston 36 by the hydraulic control from the lever 27. When these opposing pressures are in balance the piston valve 39 is in its mid or neutral position regardless of the position of the operating piston 41 and integrator or wrist plate 42. Thus the throttle lever can be adjusted to produce any desired torque meter reading. With a constant speed propeller setting the result is that the throttle lever directly controls the brake horsepower output of the engine, as measured by the output torque delivered through the propeller reduction gearing.

Since it is also desirable to select different propeller speeds for different operating conditions, and suitable adjustable governing means is provided to control such so-called constant speed propellers to vary the speed setting thereof, the propeller pitch control lever 28 may conveniently be connected to the propeller governor control by a hydraulic operating connection similar to that already described in connection with the throttle lever 27.

The cams 29 and 30 may conveniently be coordinated or tailored to produce optimum relationships between the throttle and propeller control levers 27 and 28 for various operating conditions such as take-off, cruise, and best economy, and the cams may also be arranged to release both levers for manual operation when the cam lever 31 is turned to one extreme.

As previously mentioned, the usual carbureter mixture control 26 may be built into the carbureter and thus be fully automatic, although it is somewhat preferable to retain a manual control thereof to independently control engine heating and cooling by variation of the mixture. Since the turbo supercharger also affects the optimum mixture control this might be obtained by a suitable linkage to the integrator or wrist plate 42. However, I have chosen to show the mixture control as carried by a flexible push-pull linkage 45 to a lever 46 on the side of the throttle and propeller lever stand.

Figure IV shows a diagram of the resulting engine revolutions corresponding to the different positions of the throttle control lever 27. The dotted continuation line A represents run up on the ground under sea level conditions, while dotted line B corresponds to 15,000 ft. elevation. Line C results from an air speed of 100 M. P. H. at sea level, and line D the corresponding curve at 15,000 ft. elevation. The full line portion E, up to the normal position curve, represents climb from sea level at 200 M. P. H. The break in the line at F above the curve labeled normal position represents the point where the turbo supercharger comes into action.

It will thus be seen that I have invented an improved and coordinated engine propeller and supercharger control, wherein the throttle and turbo supercharger can be integrated so that when the pilot sets an engine speed at a desired torque the throttle and turbo settings will automatically move in coordinated action until that torque is obtained. Further, the desired relationship between the control setting and engine torque can be predetermined for best operating results under different conditions of service, so that the engine throttle and turbo control can be directly operated by the difference between the engine torque required and variations in the actual torque developed.

Having thus described my invention and the present preferred embodiments thereof, I desire to emphasize the fact that many modifications may be resorted to in a manner limited only by a just interpretation of the following claims.

I claim as my invention:

1. An engine and propeller control including in combination an engine having a throttle, adjustable speed propeller governor, a torque meter and a turbosupercharger having a waste gate, comprising a torque responsive governor integrating both the throttle controlling the engine and the waste gate controlling the turbosupercharger, remote control means for separately adjusting the torque responsive governor and the propeller governor, and means for simultaneously adjusting said remote control means to predetermined relationships of propeller governor adjustments and engine torque at various engine operating conditions.

2. An engine and propeller control including in combination an engine, an adjustable speed propeller, a throttle, a torque meter, and a turbosupercharger, a piston responsive to the torque developed by said engine, adjustable means for resiliently opposing the movement of said torque responsive piston whereby to selectively balance the same at different torque measurements as imposed thereon throughout the desired range of engine torque, a power supply source, means energized by movement of said torque responsive piston from its balanced position to distribute the source of power, differentially interconnected linkages between the engine throttle and turbosupercharger for controlling the same, means energized by the source of power distributed by said last mentioned means so constructed and arranged as to operate said linkages in a direction to develop an actual engine torque equal to the balanced position of said adjustable means opposing the movement of said torque responsive piston, control means for adjusting the speed of said propeller, and a manually adjustable master control for simultaneously adjusting both the first mentioned adjustable means and the control means for the propeller whereby to produce optimum propeller and engine torque for different operating conditions.

EDWARD B. MERIPOL.

REFERENCES CITED

The following references are of record in the file of this patent:

UNITED STATES PATENTS

| Number | Name | Date |
| --- | --- | --- |
| 1,995,800 | Dodson | Mar. 26, 1935 |
| 2,187,120 | Gosslau et al. | Jan. 16, 1940 |
| 2,217,364 | Halford et al. | Oct. 8, 1940 |
| 2,248,245 | MacClain | July 8, 1941 |
| 2,262,022 | Lundquist et al. | Nov. 11, 1941 |
| 2,297,235 | Muller | Sept. 29, 1942 |
| 2,305,810 | Muller | Dec. 22, 1942 |
| 2,314,926 | Egli | Mar. 30, 1943 |
| 2,322,303 | Martin | June 22, 1943 |

FOREIGN PATENTS

| Number | Country | Date |
| --- | --- | --- |
| 467,103 | Great Britain | June 10, 1937 |